US006243866B1

(12) United States Patent
Rudolph et al.

(10) Patent No.: US 6,243,866 B1
(45) Date of Patent: Jun. 5, 2001

(54) METHOD AND DEVICE FOR VIDEO, SOUND AND DATA TRANSMISSION

(75) Inventors: Dietmar Rudolph, Berlin; Bernd Boelike, Koenigs Wusterhausen, both of (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 08/910,825

(22) Filed: Aug. 13, 1997

(30) Foreign Application Priority Data

Aug. 15, 1996 (DE) .............................................. 196 32 791

(51) Int. Cl.[7] ........................................................ H04J 3/16

(52) U.S. Cl. .......................... 725/123; 370/487; 370/528; 370/262; 725/98

(58) Field of Search .................................... 370/528, 487, 370/470, 473, 280, 282, 278, 296; 348/12, 13; 379/56.1–56.3; 455/561, 3.1, 4.2, 5.1, 85; 375/132, 130; 725/98, 123

(56) References Cited

U.S. PATENT DOCUMENTS

| | | | | |
|---|---|---|---|---|
| 3,995,120 | * | 11/1976 | Pachynski, Jr. | 370/528 |
| 4,747,160 | | 5/1988 | Bossard . | |
| 4,813,040 | * | 3/1989 | Futato | 370/528 |
| 5,388,101 | * | 2/1995 | Dinkins | 370/95.1 |
| 5,432,779 | * | 7/1995 | Shimo et al. | 455/85 |
| 5,499,047 | * | 3/1996 | Terry et al. | 348/6 |
| 5,511,236 | * | 4/1996 | Umstattd et al. | 455/85 |

(List continued on next page.)

FOREIGN PATENT DOCUMENTS

| | | |
|---|---|---|
| 44 06 509 | 8/1995 | (DE) . |
| 0 282 347 | 9/1988 | (EP) . |
| 0 402 809 | 12/1990 | (EP) . |
| 0 670 640 | 9/1995 | (EP) . |
| WO 94/24783 | 10/1994 | (WO) . |

OTHER PUBLICATIONS

"Lower Layer Protocols And Physical Interfaces", DAVIC 1.1 Specification Part 8, Revision 3.3, Digital Audio–Visual Council.

Michael Thiele, "Digitaler Rundfunk in den Startlöchern"*, Elekronik Nov. 1995, pp. 35–50.

Leopold Bömer et al., "An AN–Radio System Using CDMA Air Interface to Establish Narrowband, Broadband and ATM Radio Links",AEÜ , vol. 49, 1995, No. 3, pp. 120–128.

Johannes, Wissing, Firoz Kaderali, "Bandbreitenflexibilität für Benutzer and Betreiber von ATM–Netzen"*, Telekom Praxis, Jul. 1996, pp. 24–34.

Heinrich Armbrüster, "Dritte Generation der Mobilkommunikation"* , Telcom Report 15, 1992, H.2, pp. 60–63.

Gregor Kleine, "Die Einführung des digitalen Fensehens"*, Elektor Sep. 1995, pp. 60–67.

Klemens Gaida, "Die Architektur des Information–Highway"* , Funkschau Jul. 1995, pp. 26–31.

*Primary Examiner*—Andrew Faile
*Assistant Examiner*—Reuben Brown
(74) *Attorney, Agent, or Firm*—Kenyon & Kenyon

(57) ABSTRACT

Through a memory device and a control circuit on the transmitter side, temporal gaps are inserted into the data stream, said temporal gaps being removed again on the receiving side by an additional memory device. Consequently, the necessary continuous data stream is able to be reproduced for the transmission of the video signals. The gaps in the data stream of the base station and the data and the requests are evaluated by a user-side control circuit, from these, switch-over signals are generated, and the user devices are switched over. The base state switches the station to receive mode in the temporal gaps of the video signals or of the data stream. The present invention is applicable to the transmission of continuous signals using a backward channel via microwaves.

20 Claims, 3 Drawing Sheets

U.S. PATENT DOCUMENTS 5,528,582 * 6/1996 Bodeep et al. .......................... 370/24
5,598,148 * 1/1997 Koechler .............................. 370/528
5,600,636 * 2/1997 Makelainen et al. ................ 370/296
5,666,358 * 9/1997 Paratore et al. ..................... 370/347
5,706,048 * 1/1998 Davis ..................................... 348/12
5,719,872 * 2/1998 Dubberly et al. .................... 370/487
5,732,076 * 3/1998 Ketseoglou et al. ................. 370/442
5,768,269 * 6/1998 Rakib et al. ......................... 370/342
5,793,759 * 8/1998 Rakib et al. .......................... 455/3.1
5,802,046 * 9/1998 Scott .................................... 370/280
5,805,203 * 9/1998 Horton .................................. 348/12
5,809,395 * 9/1998 Hamilton-Piercy et al. ......... 455/4.1
5,867,485 * 2/1999 Chambers et al. ................... 370/281
5,930,262 * 7/1999 Sierens et al. ....................... 370/442
6,006,069 * 12/1999 Langston ................................ 455/62

* cited by examiner

METHOD AND DEVICE FOR VIDEO, SOUND AND DATA TRANSMISSION

FIELD OF THE INVENTION

The present invention relates to a method and a device for video, sound and data transmission, and more particularly to a method and device which provides a two-way transmission of data between a base station and users.

RELATED TECHNOLOGY

In the field of transmission of interactive television applications, certain methods permit the transmission of asymmetrical data streams and also of some symmetrical data streams. ATM (asynchronous transfer mode) and MPEG signals (video, sound, and data signals, coded according to the standard specifications of the Motion Picture Expert Group) can be transmitted simultaneously in both directions on the basis of this principle.

At the present time, work is underway in many countries on interactive broadband systems, such systems permitting two-way transmission through a forward and a backward channel. A high bandwidth is needed for the transmission of video signals. Some broadband systems are wireless. It is customary to use a frequency range near the forward channel for the high-frequency backward channel. The closer together the forward channel and the backward channel are, the better the propagation characteristics of the two channels conform and the more likely it is that the same antenna can be used for both channels.

One such method is described, for example, in DAVIC 1.1, Specification Part 08, Lower Layer Protocols And Physical Interfaces, LMDS Specifications, Revision 1.1 3/1996. The current standardization proposals of DAVIC (Digital Audio-Visual Council) are based on the assumption of such a frequency-separation of both channels. FIG. 2 (prior art) illustrates the frequency allocation scheme in the case of a transmission between a STB (set-top box) and a bidirectional converter, which converts the transmitted and the received signal on the user side.

To provide decoupling, U.S. Pat. No. 4,747,160 and European Patent 0 282 347 propose using differing polarity of the field vectors. However, the disadvantage of this method is that it can only be used in the radio communication field and other methods have to be used for feeding the antenna systems.

Another drawback of a small distance between channels is that the transmitted signals can couple over to the receiving side. For that reason, some manufacturers favor using separated antennas. However, it should be possible to avoid the substantial outlay associated with this on the user side.

SUMMARY OF THE INVENTION

A goal of the present invention is to reduce costs on the user side, as well as for the base station. Therefore, an object of the present invention is to make double use of the antennas of the user and the base station side, to avoid using costly filters for separating the signal domains, and to provide a solution which can also be used for feeding pathways.

The present invention therefore provides a method for use in program transmission of digitalized TV-video, sound and data signals from a base station to users and back via a backward channel with time-division-multiplexing two-way operation and with HF modulation for wireless connection, characterized in that on the transmitter side, following digitalization and prior to dispatching, temporal gaps (time intervals) are formed in the data stream;

during these gaps, the HF modulation is blanked, and the transmitting antenna is switched over to receive mode for the backward channel;

the same frequency band is used for the backward channel as for the program transmission;

the switching over of the users' receiving antennas is controlled synchronously by the transmitter-side switch-over; and a memory likewise controlled by said transmitter-side switch-over is read out and read in, respectively, on the transmitter and receiver side.

Advantageous further developments and improvements of the method include: (1) that an orthogonal multicarrier method is used for modulating the forward channel or the backward channel; (2) that a code-multiplexing method is used as modulation of the backward channel, for its simultaneous use by a plurality of users; (3) that gaps for the transmission of digital information and gaps for first-time calls (first user requests to send data) and user signals are formed by the base station and inserted into the data stream, and that the gaps for first-time calls and user signals are predefined in accordance with a time pattern as periodically recurring gaps, the period duration being fixed as a function of the volume of traffic and of the distance to the base station; and (4) that after the first-time call, each accepted user is assigned his or her own code, which in the event of a lasting interruption in the return call on the part of the user of a defined duration, which is preferably a function of the traffic density, is canceled and assigned elsewhere. The code multiplexing and the division of gaps into those for first time calls and those for transmission of digital information are similar to those known from the mobile telephone communications field.

The present invention also provides a device for transmission of digitized TV-video, sound and data signals, comprising transmitters or receivers with HF modulators or demodulators and antennas, which have available a backward channel for wireless connection, characterized in that assigned in each case to the base station and to the users are memory devices, converters, and switch-over devices for switching over the direction of the antennas as transmitting and receiving antennas, as well as a control device, which produces transmission gaps at the base station, and are switched in the case of the users as a function of the control of the base station and of predefined time periods.

Advantageous further developments of this device and improvements thereto include: (1) that the same oscillator is used in the converter of the base station and of the users, in each case for sending and receiving; (2) that a switching signal for activating the switch-over is fed via the HF feeder line to the converters; and (3) that in the case of intermediately switched cable distribution networks designed for one direction and comprising a head-end station at the receiving antenna and a plurality of users, the switching over of the antennas takes place in the head-end station and the storage with the user and the head-end station, and that the backward direction is bridged by means of additional wireless connection(s), preferably in the ISM band.

In a surprisingly simple manner, the present invention makes it possible to use the same HF channel to supply video signals, i.e. to use continuous data streams for the forward and backward directions. The somewhat contradictory goals of, on the one hand, providing continuous video data streams necessary for the forward path and, on the other hand, permitting larger gaps necessary in the backward channel data stream are overcome by interposing receiver-side memory devices. The method unites logical backward channels and logical forward channels in one physical channel (i.e. at a single transmission frequency).

BRIEF DESCRIPTION OF THE DRAWINGS

The present invention will be elucidated in the following on the basis of exemplary embodiments. The corresponding drawings show.

DETAILED DESCRIPTION

Figure 1:
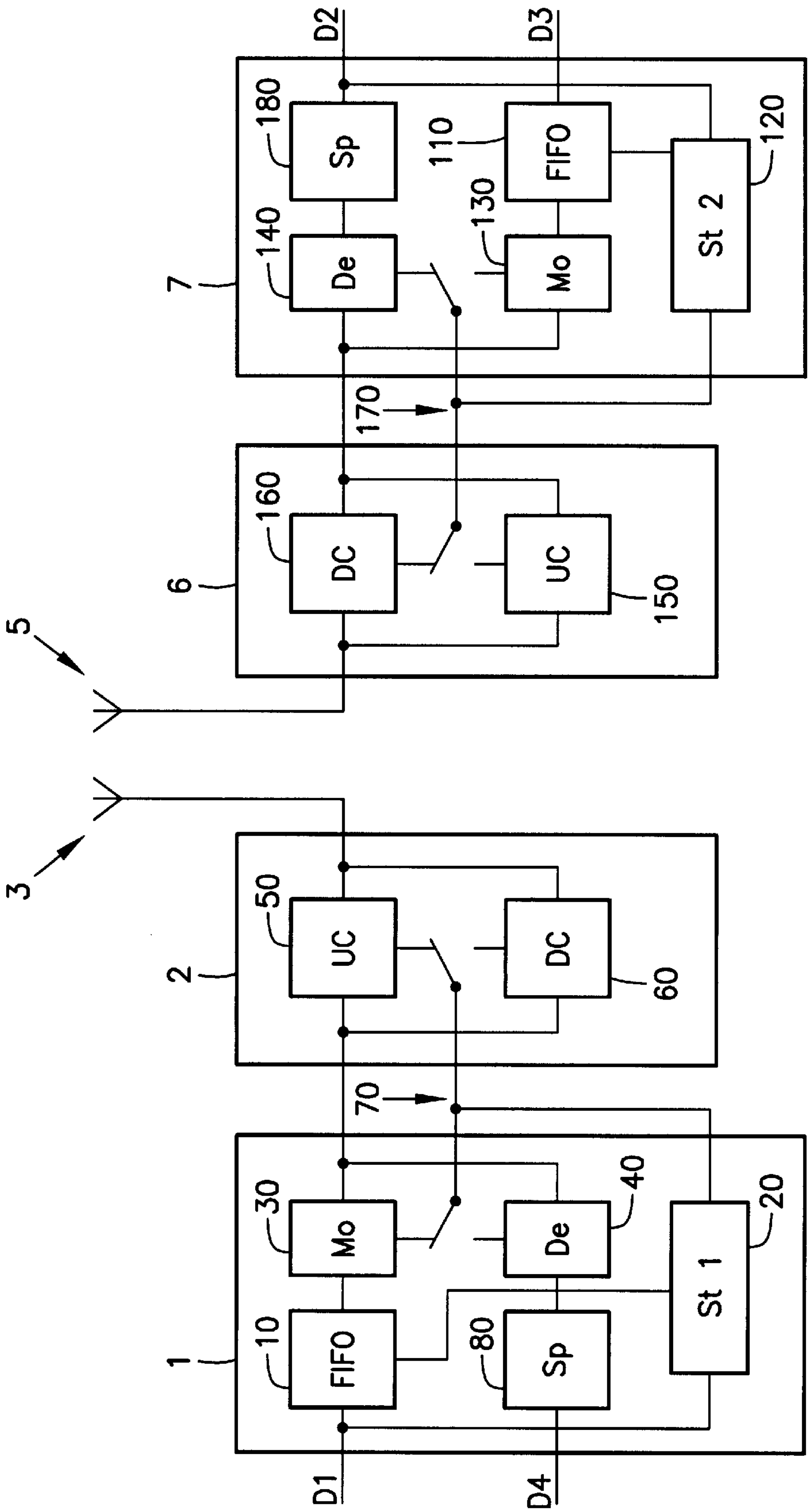
FIG. 1 schematically represented, one base station and one user station.
Figure 2:
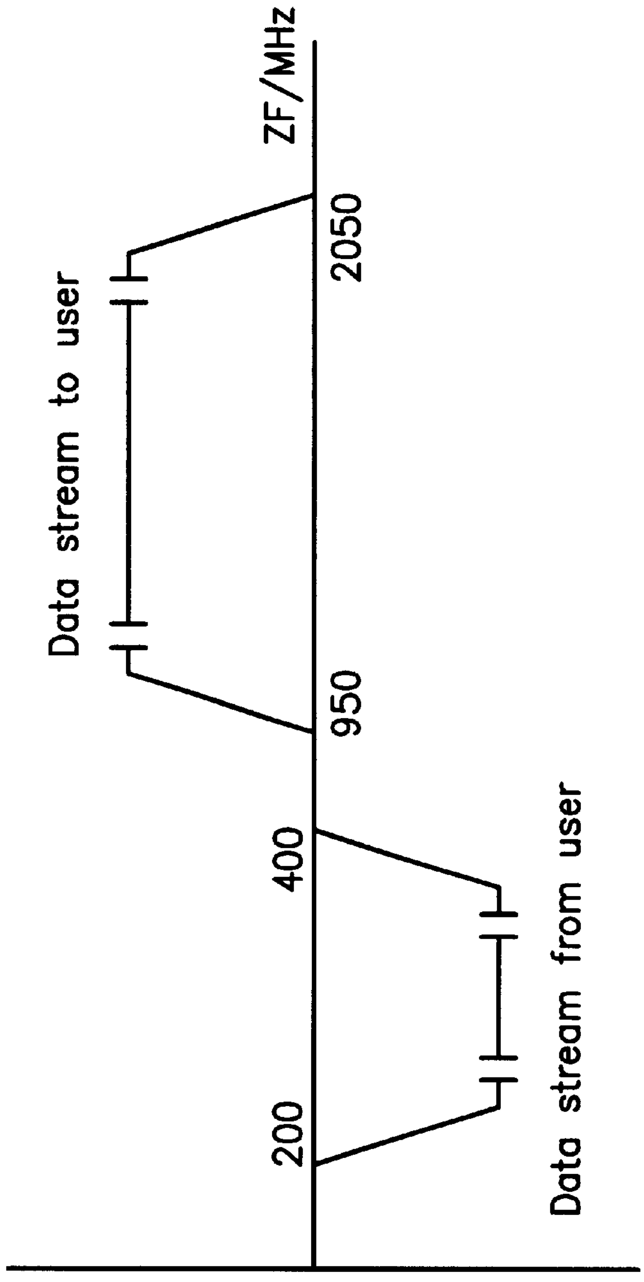
Fig. 2 (Prior Art)
FIG. 2 the known frequency allocation scheme as per DAVIC.

FIG. 1 shows a base station 1, a base station conversion unit 2, a base station antenna 3, a user antenna 5, a user conversion unit 6 and a user receiver unit or set top box 7. The conversion units 2, 6 up and down convert the HF signals transmitted between the antennae 3 and 5 in known fashion.

The present invention provides that a forward data stream, for example a television program emitted from the base station 1, is provided with gaps, so that a user may send information or requests back to the base station through a return data stream interposed in the gaps.

To produce gaps in a data stream D1, which is to be emitted by the base station 1, the data stream D1 is fed into a FIFO memory 10, as shown in FIG. 1. The data stream D1 is simultaneously directed into control circuit St1, represented by block 20. As a function of the data and of a predefined time, control circuit St1 generates control signals for the readout operation from the FIFO memory 10 and activation signals for modulator Mo, shown at block 30, or demodulator De, shown at block 40. (As a specific example of the control circuit generating control signals as a function of the data and of a predefined time, the control circuit St1 can create the gaps periodically, and set the gap duration to a time based on the volume of traffic in data stream D4 or D1. Of course, other combinations are possible such as creating gaps based on the volume of data in data stream D1 and setting the gap duration to a fixed time.) The control circuit St1 also generates activation signals for the corresponding conversion, upwards by means of an up converter UC, shown at block 50, or downwards by means of a down converter DC, shown at block 60. The signal flow in the HF channel and, of course, also in the feeding and receiving devices is stipulated by control circuit St1. The signals can be routed from the conversion units to the signal conditioning units in accordance with the same time regimen.

A switch 70 directs the data flow within the base station 1. As shown in FIG. 1, the switch 70 is such that the main or forward data stream is sent through the modulator Mo to be up converted to the antenna 3 and sent to the user. When a signal from the user is to be received, the user signal is down converted and demodulated and stored in a memory 80, which can then be read out as data stream D4. The switch 70 in this condition is switched downwards from the position shown in FIG. 1.

At set top box 7, the control circuits St2, shown at block 120, are available to the users and are normally switched to a receive mode, as shown. The main data stream having the gaps is received through user antenna 5, down converted through down converter 160, demodulated through demodulator 140, stored in memory 180, and sent out as data stream D2. This data stream D2 is, for example, a television program the same as that supplied by data stream D1, but slightly time delayed as a function of at least the transmission distance between the antennae and of the storage time in the memories.

Only when control circuit St1 at the base station 1: (a) produces a gap in the main data stream and switches over to receive, and the previously transmitted data stream permits a switch over, and (b) when a request from this user is provided, does the corresponding control circuit St2 switch over the set top box 7 and user converter unit 6 to a send mode. (A request from the user may be determined, for example, by the user sending data through data stream D3 into a FIFO memory 110 and St2.) When a gap in the main data stream arrives (or a switch over signal is received, as described below), the switch 170 is then switched downward from that shown in FIG. 1, and the data in FIFO memory 110 is read out through modulator 130, up converter 150 and antenna 5 to the base station as the gap occurs in the main data stream.

The temporal gaps in the data stream of the base station are advantageously subdivided on the one hand into gaps for first time calls and user signals, which periodically recur, but whose time periods are defined as a function of the volume of traffic and of the distance to the base station, and on the other hand into gaps for digital information pertaining to the user. After a request signal has been transmitted by a user device in the gaps for first-time calls and user signals, and this request has been accepted by the base station, digitalized information can be transmitted by the user device in the gaps of the base station's data stream provided for that purpose. A similar transmission scheme is known from mobile communications, for example the GSM (Global System Mobile Communications) standard, which permit a time advance as a function of the user's distance to the base station.

A switch-over signal can be transmitted from control circuit St1 to the converter unit, just as when polarization received from satellite systems is switched over, through a different voltage over the HF supply line. In the same way, the converters can be fed over this line. These advantageous ways of utilizing the feeder line for the transmission in both directions, for the transmission of the supply voltage and of the switch-over voltage can, of course, also be effected on the user side. Thus, it is the case when this method is applied that only one line to the converter unit is needed.

Figure 3:
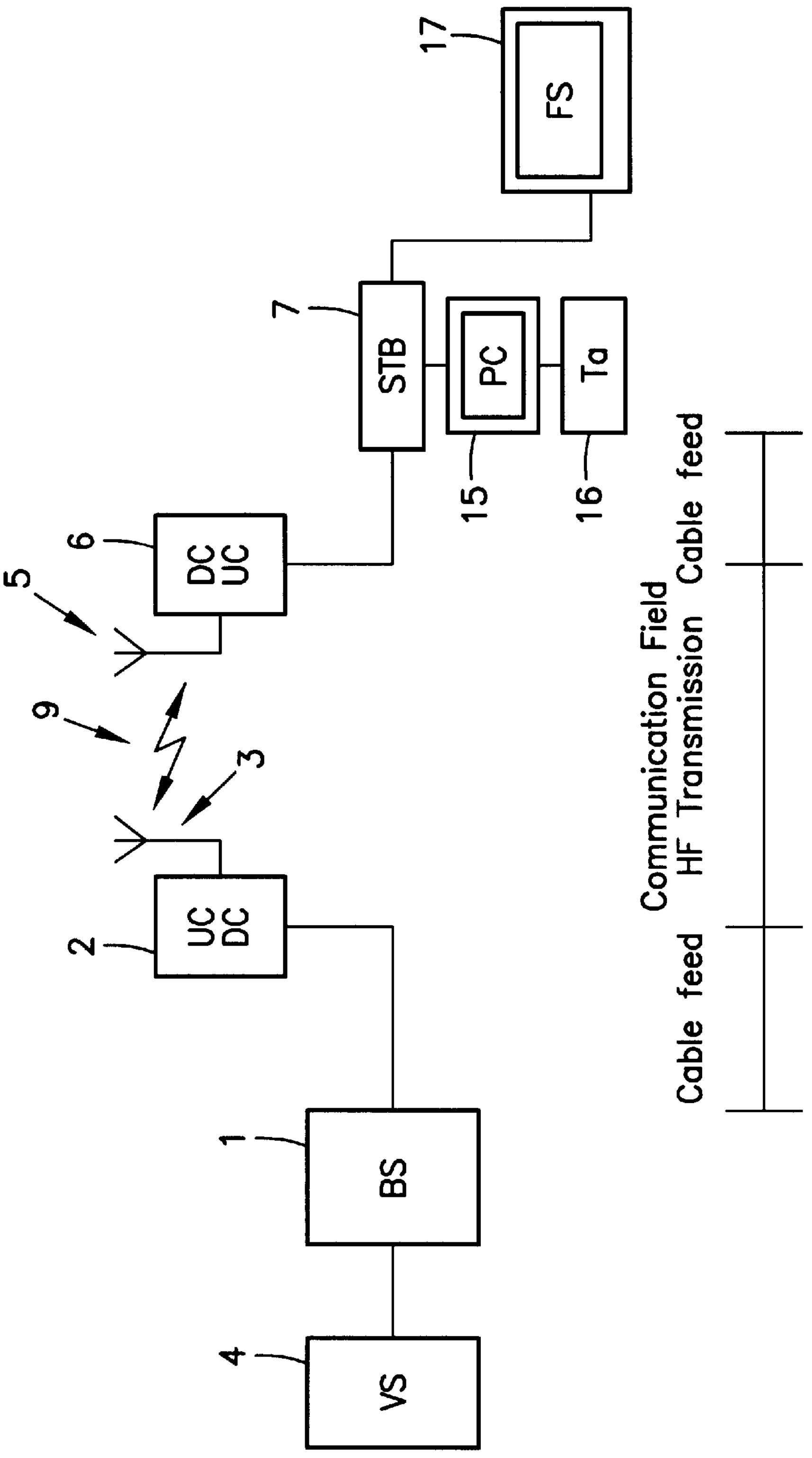
FIG. 3 one field of application of the invention.

FIG. 3 depicts the advantageous use of the present invention in a single connection. Depicted is a connection from a video server 4 via base station 1, converter or conversion unit 2 (up converter UC, down converter DC), a radio or microwave-communication field 9 and, again on the user side, to the converter or conversion unit 6 (up converter UC, down converter DC), and to the auxiliary device 7 (set-top box).

The connection shown allows the signal flow in both directions, the base station specifying the time regimen, i.e., the gaps. The converters comprise, on both sides of such a connection, units for converting to higher frequencies (up converters UC) and units for converting to lower frequencies (down converters DC). Illustrated on the user side is also a personal computer 15 with keyboard 16 and a video device 17.

In cable distribution networks that are not designed for backward transmission, the backward channel can be so constituted that each subscriber has at its disposal in the ISM (in-service monitoring) band a transmitter which bridges the pathway to the head-end station of the cable distribution network. In the head-end station, a conversion to the previously described time slot process can take place for the (further) backward channel between the base station and the head-end station. On the way back between the subscriber and the head-end station, a frequency hopping method can be applied.

Analog television signals may likewise be transmitted in the forward and backward direction, the control circuits only being able to draw upon the pulse frames and external control signals for analysis purposes. The present method is not limited to HF channels. It can generally also be applied to the feeder lines to the converters and even to an adjoining cable. The control devices St1 and St2 can be microprocessors.

The following is a description of several of the abbreviations used herein:

ATM—asynchronous transfer mode, packet-assembled asynchronous transmission operation
BS—base station
D1—data stream, transmission data stream of the base station
D2—data stream, receiving data stream of the user
D3—data stream, transmitting data stream of the user
D4—data stream, receiving data stream of the base station
FS—television unit
St1—control circuit of the base station
St2—control circuit of the user
DC—down converter, converting to low frequency
De—demodulator
FIFO—first in first out, data storage unit
LMDS—local multipoint distribution service system, local microwave system (f=10 GHz–60 GHz)
MAC—medium access control, access control
MMDS—multichannel multipoint distribution service system, multipoint microwave distribution system (f=2–10 GHz)
Mo—modulator
NIU—network interface unit, transition unit to the network
PC—personal computer
Sp—memory device
STB—set-top box, auxiliary device at subscriber
Ta—keyboard
TDMA—time division multiple access, time division for simultaneous accessing of various subscribers
UC—up converter, converting to higher frequency
VOD—video-on-demand
VS—video server, computer station for supplying many TV programs, which are simultaneous, but vary in time
MPEG signals—video, sound and data signals, which are coded in accordance with the standard instructions of MPEG (Motion Picture Expert Group).

What is claimed is:

1. A method for a transmission of digitized TV-video signals from a base station to users through a forward video data stream, and for providing a backward channel from the users to the base station using a time-division-multiplexing two-way operation and with HF modulation for wireless TV transmission, the method comprising the steps of:

reading into a base station memory the forward video data stream;

reading out the forward video data stream from the base station memory and activating the HF modulation as a function of the forward video data stream and a predefined time so as to provide a continuous video data stream;

providing temporal gaps in the forward video data stream, the temporal gaps being provided after any digitization of the forward video data stream;

during the temporal gaps, turning off the HF modulation at the base station and switching over a transmitting antenna to a receive mode for receiving the backward channel, the same frequency band being used for the backward channel and transmission of the forward video data stream;

switching over user antennas, synchronously with the switching over of the transmitting antenna, from a user receive mode to a user transmit mode, the switching over of the user antennas being a function of the temporal gaps; and reading out the forward video data stream from a user memory so as to provide the continuous video data stream.

2. The method as recited in claim 1 wherein the base station memory is a FIFO memory.

3. The method as recited in claim 1 further comprising the steps of reading in user communications into a second user memory, transmitting the user communications through the backward channel, and reading out the user communications from a second base station memory.

4. The method as recited in claim 1 wherein an orthogonal multicarrier method is used for modulating the forward video data stream or the backward channel.

5. The method as recited in claim 1 wherein a code-multiplexing method is used as modulation of the backward channel for simultaneous use by a plurality of users.

6. The method as recited in claim 1 wherein the temporal gaps comprise gaps for the transmission of digital information and gaps for first-time calls, and further comprising the step of inserting user signals formed by the base station into the forward video data stream; the gaps for first-time calls and user signals being predefined in accordance with a time pattern as periodically recurring gaps, a period duration being a function of a volume of traffic and of a distance from the user to the base station.

7. The method as recited in claim 6 wherein after the first-time call, each user is assigned a user-specific code.

8. A device for transmission of digitalized TV-video signals using a time-division-multiplexing two-way operation and with HF modulation for wireless TV transmission, the device comprising:

a base station having a base station memory and a control device for producing transmission gaps in a forward video data stream to be transmitted from the base station and for controlling a reading out of the forward video data stream from the base station memory and activating the HF modulation as a function of the forward video data stream and a predefined time so as to provide a continuous video data stream;

a base station antenna for transmitting the forward video data stream;

a user antenna having a receive mode for receiving the forward video data stream and transmit mode for transmitting user data;

at least one user station having a user memory for storing information from the forward video data stream, a switch-over device for switching the user antenna from the receive mode to the transmit mode as a function of transmission gaps, and a second control device for reading out the stored information from the forward video data stream in the user memory so as to provide the continuous video data stream.

9. The device as recited in claim 8 further comprising a base station switch-over device for switching the base antenna to a receive mode.

10. The device as recited in claim 8 wherein the base station memory is a FIFO memory.

11. The device as recited in claim 8 further comprising a second user memory for storing user-originated data.

12. The device as recited in claim 11 further comprising a second base station memory for storing the user-originated data in the base station.

13. The device as recited in claim 8 further comprising a base station converter unit for up converting the forward video data stream and a user converter unit for down converting the forward data stream.

14. The device as recited in claim 13 wherein a similar oscillator is used in both the base station converter unit and the user converter unit.

15. The device as recited in claim 8 further comprising a switch in the user station and wherein a switching signal for activating the switch is fed from the base station via an HF signal.

16. The device as recited by claim 8 wherein the at least one user station is part of an intermediately switched cable distribution network designed for one direction; the network comprising a head-end station having the user antenna and a plurality of user stations.

17. The device as recited in claim 16 wherein the switching takes place in the head-end station, and that a backward channel is bridged by through an additional wireless connection.

18. The device as recited in claim 17 wherein the additional wireless connection operates in the ISM band.

19. The device as recited in claim 8 wherein there are a plurality of user stations.

20. The device as recited in claim 8 wherein the at least one user station always operates at a fixed distance from the base station.

* * * * *